Oct. 22, 1946.     D. G. CLIFFORD     2,409,664

ELECTRODE SUPPORT

Filed Sept. 17, 1943

INVENTOR
D. G. CLIFFORD
BY
ATTORNEY

Patented Oct. 22, 1946

2,409,664

UNITED STATES PATENT OFFICE 2,409,664

ELECTRODE SUPPORT

David G. Clifford, Palo Alto, Calif., assignor to Westinghouse Electric Corporation, East Pittsburgh, Pa., a corporation of Pennsylvania Application September 17, 1943, Serial No. 502,746

8 Claims. (Cl. 250—27.5)

This invention relates to electrode supports and has particular utility as a cathode support in such devices as "Magnetrons," "Klystrons" and other electron discharge devices.

One of the serious problems encountered in manufacture and use of electron discharge devices, particularly such as above mentioned, is vibration occurring in an electrode, such as a cathode or anode, anchorage of the mounting means for which is remote from the electrode. It has been found in such devices that there are frequency or wavelength shifts of finite amount resultant from vibrational changes in cathode position with respect to the anode. Appreciable amplitudes of cathode vibration exist in present-day devices of the character specified, and due to the harmonic pyramiding of the vibration the cathode displacement often builds up to large amplitude and becomes a major consideration. In one cycle of vibration the cathode travels from the normal or equilibrium position to a maximum displacement in one direction, thence back through the equilibrium position to a maximum displacement in the opposite direction and thence back to equilibrium or zero position. The amplitude of the vibration is equal to the average of the two maximum displacements. The frequency of vibration can be defined as the number of complete cycles occurring in a time of one second.

When the frequency of vibration of the cathode is substantially equal to an applied or existing tremor of the device, as for instance a tremor resulting from vibration of an air-plane in which the device is mounted, or from an associated motor in an apparatus assembly, a resonance peak of cathode vibration is produced. Other resonance peaks will occur at harmonic intervals of either cathode vibration or tremor effective on the device of which the cathode is a part.

The particular electron discharge devices above identified have use in microwave radar equipment which, in its general aspects, comprises essentially a transmitter for projecting electromagnetic signals into space, where they are reflected from an object or target, and then received back again substantially at source by a receiver. Transmitted microwaves from the electron discharge device as used in radar equipment are subject to inherent frequency perturbations producing in them certain microwave frequency band widths, not uncommonly of the order of two-or-so megacycles. Vibrations of the discharge device cathode also give rise to frequency modulations, as indicated above, and said inherent perturbations in frequency and said cathode vibration modulations in frequency, occurring simultaneously, add algebraically in a determination of the frequency band width of the signal. Thus the frequency band width is greater due to the cathode vibration and the receiver must accommodate this extra band width. But widening the receiver frequency band is objectionable as it admits more noise and static, and decreases the maximum range at which targets can be detected.

The above considerations stress the need for overcoming or preventing to maximum extent, electrode vibration, and the primary object of the present invention is to accomplish this desideratum.

More specifically, an object of the invention is to provide vibration-absorption means as a part of the electrode support.

Another object of the invention is to provide a vibration-absorption means mutually effective to quench vibration initiating either in the cathode or in the mounting means therefor.

A further object of the invention is to provide a vibration-absorption means effective to accomplish its purpose within the range of vibrational frequencies encountered in electron discharge devices and recurring many times within a second.

Yet another object of the invention is to provide a vibration-absorption means for an electrode with minimum change in the construction of and parts normally used in electron discharge devices.

Still further objects of the invention will appear as the description progresses, both by direct recitation thereof and by implication from the context.

Referring to the accompanying drawing in which like numerals of reference indicate similar parts throughout the several views.

Figure 1:
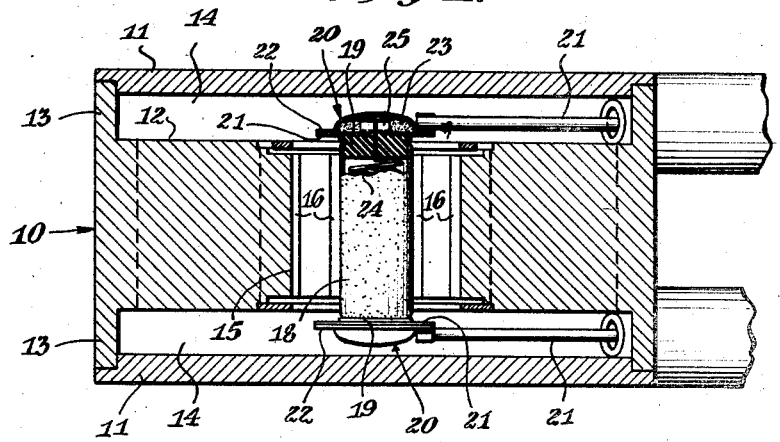
Figure 1 is a sectional view of a magnetron with my vibration-absorption electrode support therein.

In the specific embodiment of the invention illustrated in said drawing, and referring initially to the showing in Figure 1, the reference numeral 10 designates a cylindrical magnetron body as one example of electron discharge device having end plates or covers 11 sealed thereto whereby the interior may be evacuated. The interior of said body is formed to comprise an anode 12 of generally cylindrical shape, shorter than the body which has end flanges 13 for spacing the covers 11 from the ends of the anode and thereby affording the usual and necessary end spaces 14 within the magnetron. As usual, the magnetron provides a cathode cavity 15 coaxial with the said body and anode and extending through the anode so as to open into both end spaces 14. The anode likewise provides a plurality of resonant cavities 16 symmetrically distributed around and radiating from the cathode cavity. The ends of the resonant cavities open into the end spaces 14.

A hollow cathode 18 extends axially through the cathode cavity, projecting at its ends into said end spaces. The ends of the cathode have ceramic or other insulating collars 19 engaging the same. My improved supporting means is mounted on the outer end of said collar 19, and for brevity and in view of its construction, will be referred to as capsule 20. Preferably there is a capsule 20 at each end of the cathode. Each capsule is carried by a mounting means which is in the form of and constitutes a lead-in wire or rod 21 which extends radially of the end space in which it is situated, the two rods thus provided constituting the entire support for the cathode assembly. The structure necessarily requires anchorage of the mounting means to be remote from the end carrying the electrode and therefore introduces a considerable leverage and moment of vibration. In consquence of the length of these rods and mass of rods and electrode there is unavoidably present a vibrational movement of the cathode with respect to the anode when any tremor occurs in the device. This is true even though the rods are made of material, such as tungsten, as large and rigid as available space will permit. Quenching of this vibration constitutes the principal objective of the present invention.

Each capsule 20 preferably comprises a thin metal shell here shown as fabricated from a flat disc or plate 21 next the end of the cathode insulator or collar 19, and a centrally bulging outer plate 22 the rim of which is in the plane of the welded or otherwise secured to the marginal rim of said disc. The bulge of outer plate 22 forms, with flat plate 21, an enclosed pocket or hollow interior for the capsule. This pocket of the capsule contains vibration-absorbing or damping means, for which purpose it is shown more or less filled with granular material 23 of a character having inter-particle frictional resistance to shifting of the particles. Preferably crushed tungsten is employed as the granular material, although sand, iron filings and other granular materials may be used. However, crushed tungsten has all of the advantages of being dense, hard, heat resistant, chemically stable, and jagged in the crushed granular state. Whatever material is used should be capable of shifting its particles in such manner as to develop friction as a result of such shifting. The frictionally resisted shifting absorbs energy of the vibration impetus and quenches or damps the vibration. The jagged edges of the tungsten particles are not readily worn away, due to the hardness of the material, and remain fully effective for the useful life of the electron discharge device. It is by virtue of the jagged edges of the particles that a frictional resistance to movement is accomplished and by which vibrational energy is absorbed. The capsule is not quite filled with the granular material in order that movement of the particles may occur and through the frictional resistance to such movement effect the desired absorption of the vibrational impetus.

Location of the capsule between the cathode and the lead-in rod enables the capsule to be mutually effective to damp or quench vibration which is initiated either in the cathode or in the lead rod. It is preferred to situate the capsule at the end of the rod within the device and at the part of the rod most remote from the anchorage of the rod to the device.

A heater wire or filament 24 extends through the cathode and its insulating collars 19 and in the present showing projects through the disc or flat plate 21 of the capsule and is secured to said plate by brackets 25 as by being welded or otherwise attached both to the filament and the plate. Since the capsule of which said plate 21 is a part is secured to the lead rod, current supply for the filament is supplied from the lead rod to the filament.

Figure 2:
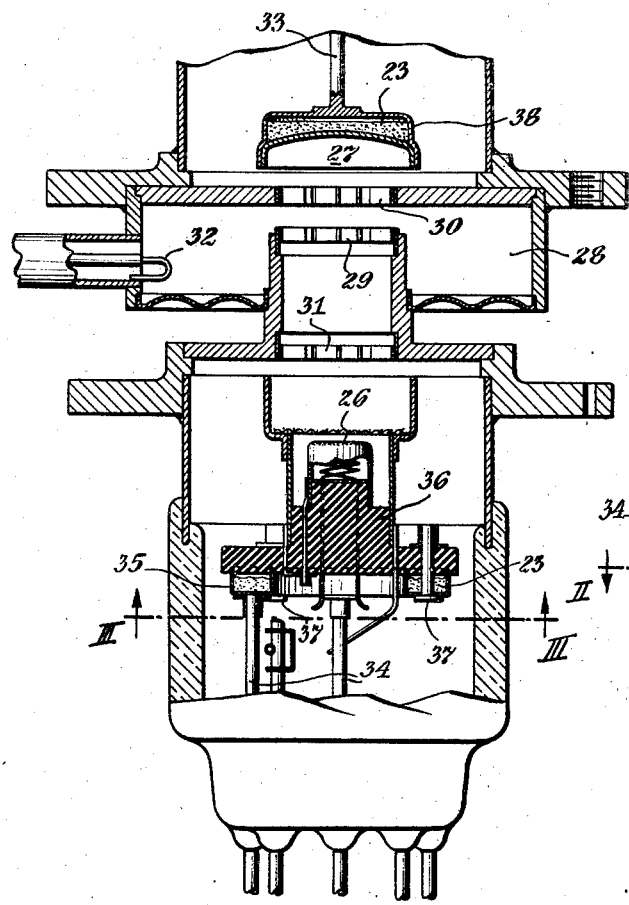
Figure 2 is a sectional view of a "Klystron" showing both the cathode and collector or anode having electrode supports in accordance with the present inventive concept.
Figure 3:
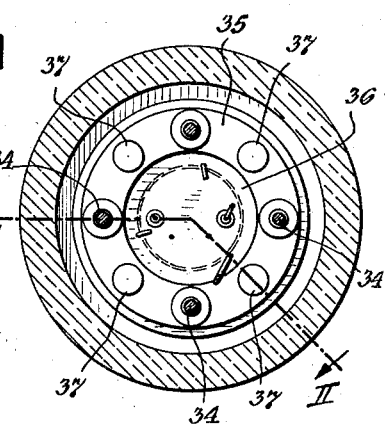
Figure 3 is a cross section upon line III—III of Figure 2.

Illustrative of the inventive concept having use in other than a magnetron and with other than a cathode, Figures 2 and 3 show the invention as applied in a "Klystron" and as supports for both a cathode and for an anode or collector.

Referring to the embodiment of the invention illustrated in Figures 2 and 3, a beam-type of electron discharge device is shown which is constructed in general as a body of revolution about an axis. The usual structural features of such a device comprise a cathode 26 in a plane normal to the axis. At a distance, from the cathode also transverse to the axis, is an anode, collector or reflector 27, said axis passing through the centers of both the cathode and anode or reflector. In the region intervening between the cathode and anode is a hollow resonant chamber 28 the opposite walls of which around the axis are perforate for passing the electron beam therethrough from the cathode to the reflector, and in this particular showing, back again into the resonator. The reflector is a specific type of anode. The perforate parts of the chamber walls, for want of better designation, are known in the trade as grids, and are here identified as the near grid 29 and far grid 30 of the resonator. Between the cathode and said near grid of the resonator is a focusing grid 31. One wall of the resonant chamber is made flexible for tuning the resonator by an adjustment of the spaced relation of the resonant chamber grids. The interior of the device is evacuated, thereby constituting the outer shell a sealed envelope. Output energy is taken from the resonator chamber by a loop 32 situated therein.

It is usual practice to mount the reflector on a lead-in post or rod 33 which is sealed through one end of the device, and to mount the cathode on a plurality of lead-in or other posts or rods 34 sealed through or in the other end of the device. These parts or mounting means are, however, subject to vibration especially in view of the mass of the reflector and cathode structures carried at the ends thereof and remoteness of anchorage of the mounting means from the electrode. According to the present invention, this vibration is damped or quenched by provision of a support providing vibration-absorption means as part thereof.

The specific construction of vibration-absorption support illustrated in connection with the cathode of the "Klystron" of Figures 2 and 3 comprises a thin-wall annular channel-shaped metallic capsule 35 with the otherwise open side of the channel next the end face of the cathode insulator or collar 36 thereby forming a hollow or pocket. A plurality of studs 37 passing through the capsule 35 and collar 36 and headed at both ends, retains the capsule and collar assembled. The flat wall of the capsule is secured at intervals on the ends of the several posts or rods 34. Within the capsule, but preferably not quite filling the same, is vibration-absorbing or damping means comprising granular material 23 having all of the characteristics and qualifications as above described in reference to Fig. 1 and therefore not again described. The function and operation will likewise be apparent from the previous description.

The specific construction of vibration-absorption support illustrated in connection with the anode or reflector comprises a thin-wall metallic cap 38 partially in which the reflector nests so as to leave a pocket between the end of the cap and the reflector. The rim of the reflector is in engagement with and attached to the margin of the peripheral wall of the cap whereby the cap and reflector together form a hollow capsule. In the hollow or pocket of this capsule is vibration-absorbing or damping means comprising granular material 23 in quantity, as before, not quite filling the pocket and likewise having all of the characteristics and qualifications, function and operation as previously described. The lead-in rod 33 is attached at its end to the end wall of the cap and thus mounts the capsule and reflector in proper position and with electrical connection from the reflector to the exterior of the device.

The several exemplifications of the invention herein illustrated and described will now make it apparent that the undesirable vibrations of an electrode instigated by tremor of the device containing the electrode is effectively damped by absorption of the vibration as frictional movement of the particles of the granular material in a pocket formed as a part with the electrode support. Resilience of the thin wall of the capsule likewise aids in the damping of the vibration in all constructions shown.

I claim:

1. In an electron discharge device having an electrode mounting anchored at one part in fixed relation to said device and subject to vibration at another part with respect to said device, an electrode supported from said mounting at the part of said mounting subject to vibration, and enclosed granular vibration damping means connected to said mounting in proximity to said electrode.

2. In an electron discharge device having an electrode mounting anchored at one part in fixed relation to said device and subject to vibration at another part with respect to said device, an electrode support on said mounting at the part thereof subject to vibration, an electrode carried by said support, and said support having enclosed granular vibration damping means therein.

3. An electron discharge device support comprising mounting means therefor, said support providing a pocket therein, and means enclosed within said pocket for damping vibration of said mounting means and support.

4. An electron discharge device support comprising mounting means therefor, said support providing a pocket therein, and granular material in said pocket for damping vibration of said mounting means and support.

5. An electron discharge device comprising an electrode and electrode mounting means, and a support interposed between said electrode and electrode mounting means, said support providing enclosed granular vibration damping means for said electrode and electrode mounting means.

6. An electron discharge device having an electrode, a hollow capsule fixed with respect to said electrode, and vibration absorbing material in said capsule.

7. An electron discharge device having an electrode, a hollow capsule fixed with respect to said electrode, and granular vibration absorbing material in said capsule.

8. An electron discharge device having an electrode, a hollow capsule fixed with respect to said electrode, and tungsten granules in said capsule for damping vibration thereof.

DAVID G. CLIFFORD.